United States Patent [19]

DeCristofaro

[11] 4,405,391
[45] Sep. 20, 1983

[54] HOMOGENEOUS, DUCTILE NICKEL-PALLADIUM BRAZING FOILS

[75] Inventor: Nicholas J. DeCristofaro, Chatham, N.J.

[73] Assignee: Allied Corporation, Morris Township, Morris County, N.J.

[21] Appl. No.: 224,879

[22] Filed: Jan. 14, 1981

[51] Int. Cl.³ ............................................. C22C 19/03
[52] U.S. Cl. ..................................... 148/403; 428/606
[58] Field of Search ...................... 75/170, 171, 172 R; 428/606; 148/403

[56] References Cited

U.S. PATENT DOCUMENTS 4,169,744 10/1979 D'Silva .................................. 75/171

Primary Examiner—R. Dean

Attorney, Agent, or Firm—Ernest D. Buff; Gerhard H. Fuchs

[57] ABSTRACT

Brazing of metal parts employing a homogeneous, ductile filler metal foil is disclosed. The brazing foil, useful for brazing iron, nickel and cobalt base alloys, has a composition essentially of 1 to about 41 atom percent palladium, 0 to about 20 atom percent chromium, 11 to about 20 atom percent boron and the balance essentially nickel and incidental impurities. In addition to containing the foregoing elements within the above noted composition ranges, the composition must be such that the total of nickel, palladium and chromium ranges from about 80 to 89 atom percent and the total amount of boron constitutes the remainder that is 11 to 20 atom percent. The ductile foil permits fabrication of preforms of complex shapes and do not require binders or fluxes.

4 Claims, No Drawings

HOMOGENEOUS, DUCTILE NICKEL-PALLADIUM BRAZING FOILS

DESCRIPTION

BACKGROUND OF THE INVENTION

1. Field of the Invention

This invention relates to brazing of metal parts and, in particular, to a homogeneous, ductile nickel-palladium based brazing material useful in brazing iron, cobalt and nickel based alloys.

2. Description of the Prior Art

Brazing is a process for joining metal parts, often of dissimilar composition, to each other. Typically, a filler metal that has a melting point lower than that of the metal parts to be joined together is interposed between the metal parts to form an assembly. The assembly is then heated to a temperature sufficient to melt the filler metal. Upon cooling, a strong, corrosion resistant, leak-tight joint is formed.

Nickel and cobalt based alloys are conventionally joined by means of hydrogen, inert gas or vacuum brazing techniques. Such methods are employed to maintain low levels of contamination in the joint area.

Precious metal base filler metals are used for the brazing of iron, nickel and cobalt base materials where resistance to corrosion and oxidation is desired. These filler metals are not suitable for joining base metals which have a high heat treatment temperature compared to the filler metal.

A variety of iron, nickel and cobalt based metals can be joined using Ni-Pd-Cr-B filler metals. These alloys cannot be made into foil form by conventional methods due to their inherrent brittle nature. Consequently, where a pore-free joint is required precious metal based filler metals which are available in foil forms are used. These precious filler metals contain a substantial amount of gold and are, therefore, relatively expensive.

Some of the filler metals of Ni-Cr-Pd-B family can be used for diffusion bonding in which the boron diffuses into the base metal. The joint region therefore becomes depleted of boron during the joining process and remelts at a higher temperature. Base metals which have a relatively higher heat treatment temperature can thus be heat treated.

Ductile glassy metal alloys have been disclosed in U.S. Pat. No. 3,856,513, issued Dec. 24, 1974 to H. S. Chen et al. These alloys include compositions having the formula $M_a Y_b Z_c$, where M is a metal selected from the group consisting of iron, nickel, cobalt, vanadium and chromium, Y is an element selected from the group consisting of phosphorus, boron and carbon, and Z is an element selected from the group consisting of aluminum, silicon, tin, germanium, indium, antimony and beryllium, "a" ranges from about 60 to 90 atom percent, "b" ranges from about 10 to 30 atom percent and "c" ranges from about 0.1 to 15 atom percent. Also disclosed are glassy wires having the formula $T_i X_j$, where T is at least one transition metal and X is an element selected from the group consisting of phosphorus, boron, carbon, aluminum, silicon, tin, germanium, indium, beryllium and antimony, "i" ranges from about 70 to 87 atom percent and "j" ranges from about 13 to 30 atom percent. Such materials are conveniently prepared by rapid quenching from the melt using processing techniques that are now well-known in the art. No brazing compositions are disclosed therein, however.

There remains a need in the art for a homogeneous nickel-palladium based brazing material that is available in ductile foil form.

SUMMARY OF THE INVENTION

In accordance with the invention, there is provided a homogeneous, ductile brazing foil useful as a filler metal for a brazed metal article. The brazing foil is composed of metastable material having at least 50 percent glassy structure, and has a thickness ranging from about 20 μm (0.0008 inch) to 90 μm (0.0035 inch).

More specifically the brazing alloy has a composition consisting essentially of 1 to about 41 atom percent palladium, 0 to about 20 atom percent chromium, 11 to about 20 atom percent boron and the balance essentially nickel and incidental impurities. In addition to containing the foregoing elements within the abovenoted composition ranges, the composition must be such that the total of nickel, palladium, and chromium ranges from about 80 to 89 atom percent and the total amount of boron constitutes the remainder that is 11 to 20 atom percent. These compositions are compatible with and more noble than nickel base alloys and are suitable for brazing nickel as well as cobalt base alloys.

The homogeneous brazing foil of the invention is fabricated by a process which comprises forming a melt of the composition and quenching the melt on a rotating quench wheel at a rate of at least about $10^5$ °C./sec.

The filler metal foil is easily fabricable as homogeneous, ductile ribbon, which is useful for brazing as cast. Advantageously, the metal foil can be stamped into complex shapes to provide brace preforms.

DETAILED DESCRIPTION OF THE INVENTION

In any brazing process, the brazing material must have a melting point that will be sufficiently high to provide strength to meet service requirements of the metal parts brazed together. However, the melting point must not be so high as to make difficult the brazing operation. Further, the filler material must be compatible, both chemically and metallurgically, with the materials being brazed. The brazing material must be more noble than the metal being brazed to avoid corrosion. Ideally, the brazing material must be in ductile foil form so that complex shapes may be stamped therefrom. Finally, the brazing foil should be homogeneous, that is, contain no binders or other materials that would otherwise form voids or contaminating residues during brazing.

In accordance with a preferred embodiment of the invention, a homogeneous nickel-palladium based brazing material is foil form is provided. The brazing foil has a composition consisting essentially of 1 to about 41 atom percent palladium, 0 to about 20 atom percent chromium, 11 to about 20 atom percent boron and the balance essentially nickel and incidental impurities. The composition is such that the total of nickel, palladium and chromium ranges from about 80 to 89 atom percent and the total amount of boron comprises the balance, that is 11 to 20 atom percent. These compositions are compatible with and more noble than nickel based alloys and are suitable for brazing iron, nickel and cobalt base alloys.

By homogeneous is meant that the foil, as produced, is of substantially uniform composition in all dimensions. By ductile is meant that the foil can be bent to a round radius as small as ten times the foil thickness without fracture.

Examples of brazing, alloy compositions within the scope of the invention are set forth in Table I below.

TABLE I

|  | Composition, % | | | |
| --- | --- | --- | --- | --- |
|  | Ni | Pd | Cr | B |
| atom % | 66 | 1 | 15 | 18 |
| wt % | 78.2 | 2.2 | 15.7 | 3.9 |
| atom % | 65 | 5 | 10 | 20 |
| wt % | 75.0 | 10.5 | 10.2 | 4.3 |
| atom % | 55 | 20 | 12 | 13 |
| wt % | 52.7 | 34.8 | 10.2 | 2.3 |
| atom % | 41 | 41 | 1 | 17 |
| wt % | 34.4 | 62.3 | 0.7 | 2.6 |
| atom % | 41 | 41 | 0 | 18 |
| wt % | 34.6 | 62.6 | 0 | 2.8 |
| atom % | 45 | 20 | 20 | 15 |
| wt % | 44.3 | 35.6 | 17.4 | 2.7 |
| atom % | 61 | 18 | 10 | 11 |
| wt % | 58.4 | 31.2 | 8.5 | 1.9 |

The brazing temperature of the brazing alloys of the invention ranges from about 1100° C. to 1300° C.

The brazing foils of the invention are prepared by cooling a melt of the desired composition at a rate of at least about $10^5$° C./sec, employing metal alloy quenching techniques well-known to the glassy metal alloy art; see, e.g., U.S. Pat. No. 3,856,513, discussed earlier. The purity of all compositions is that found in normal commercial practice.

A variety of techniques are available for fabricating continuous ribbon, wire, sheet, etc. Typically, a particular composition is selected, powders or granules of the requisite elements in the desired portions are melted and homogenized, and the molten alloy is rapidly quenched on a chill surface, such as a rapidly rotating metal cylinder.

Under these quenching conditions, a metastable, homogeneous, ductile material is obtained. The metastable material may be glassy, in which case there is no long range order. X-ray diffraction patterns of glassy metal aloys show only a diffuse halo, similar to that observed for inorganic oxide glasses. Such glassy alloys much be at least 50% glassy to be sufficiently ductile to permit subsequent handling, such as stamping complex shapes from ribbons of the alloys. Preferably, the glassy metal alloys must be at least 80% glassy, and most preferably substantially (or totally) glassy, to attain superior ductility.

The metastable phase may also be a solid solution of the constituent elements. In the case of the alloys of the invention, such metastable, solid solution phases are not ordinarily produced under conventional processing techniques employed in the art of fabricating crystalline alloys. X-ray diffraction patterns of the solid solution alloys show the sharp diffraction peaks characteristic of crystalline alloys, with some broadening of the peaks due to desired finegrained size of crystallites. Such metastable materials are also ductile when produced under the conditions described above.

The brazing material of the invention is advantageously produced in foil (or ribbon) form, and may be used in brazing applications as cast, whether the material is glassy or a solid solution. Alternatively, foils of glassy metal alloys may be heat treated to obtain a crystalline phase, preferably fine-grained, in order to promote longer die life when stamping of complex shapes is contemplated.

Foils as produced by the processing described above typically are about 20 to 90 μm (0.0008 to 0.0035 inch) thick, which is also the desired spacing between bodies being brazed. Such spacing maximizes the strength of the braze joint. Thinner foils stacked to form thicknesses greater than 90 μm may also be employed. Further, no fluxes are required during brazing, and no binders are present in the foil. Thus, formation of voids and contaminating residues is eliminated. Consequently, the ductile brazing ribbons of the invention provide both ease of brazing, by eliminating the need for spacers, and minimal post-brazing treatment.

The brazing foils of the invention are superior to various powder brazes of the same composition in providing good braze joints. This is probably due to the ability to apply the brazing foil where the braze is required, rather than depending on capillarity to transport braze filler from the edge of surfaces to be brazed.

EXAMPLES

EXAMPLE 1

Ribbons about 6.5 mm (0.25 inch) wide and about 25 to 60 m (about 0.0010 to 0.0025 inch) thick are formed by squirting a melt of the particular composition by overpressure of argon onto a rapidly rotating copper chill wheel (surface speed about 1000 to 2000 m/min). Metastable, homogeneous ribbons of substantially glassy alloys having compositions listed in Table II in weight percent and atom percent are produced.

TABLE II

| Sample | | Composition, % | | | |
| --- | --- | --- | --- | --- | --- |
| | | Ni | Pd | Cr | B |
| 1 | atom % | 66 | 1 | 15 | 18 |
|   | wt % | 78.2 | 2.2 | 15.7 | 3.9 |
| 2 | atom % | 65 | 5 | 10 | 20 |
|   | wt % | 75.0 | 10.5 | 10.2 | 4.3 |
| 3 | atom % | 55 | 20 | 12 | 13 |
|   | wt % | 52.7 | 34.8 | 10.2 | 2.3 |
| 4 | atom % | 41 | 41 | 1 | 17 |
|   | wt % | 34.4 | 62.3 | 0.7 | 2.6 |
| 5 | atom % | 41 | 41 | 0 | 18 |
|   | wt % | 34.6 | 62.6 | 0 | 2.8 |
| 6 | atom % | 45 | 20 | 20 | 15 |
|   | wt % | 44.3 | 35.6 | 17.4 | 2.7 |
| 7 | atom % | 61 | 18 | 10 | 11 |
|   | wt % | 58.4 | 31.2 | 8.5 | 1.9 |

EXAMPLE 2

Tensile test specimens are cut from Hastelloy alloy X ("Hastelloy" is a registered trademark of Cabot Corporation, Kokomo, Ind.), in strip form. The composition of Hastelloy alloy X is given in Table III.

TABLE III

|  | Composition, weight % | | | | | |
| --- | --- | --- | --- | --- | --- | --- |
|  | Ni | Cr | Mo | W | Fe | C |
| Hastelloy alloy X | Bal | 22 | 9 | 0.6 | 19 | 0.1 |

The thickness is 0.3175 cm (0.125 inch). A brazing alloy of the invention, a glassy, ductile ribbon of nominal composition of sample no. 1 and having dimensions 38.1 μm (0.0015 inch) thick by 6.3 mm (0.25 inch) wide, is used to braze the test specimens.

The tensile specimens are dimensioned and fabricated as lap shear specimens per AWS C3.2-63. The specimens are cut perpendicularly to the length direction. Braze joints are of the lap type, with the lap dimensions carefully controlled to 1.27 cm (0.5 inch). Brazing specimens are degreased with warn benzene. Lap joints containing brazing ribbons of the invention are assembled with the ribbons side by side, the length of the lap joint. In the case of these brazing alloys, the ribbons act as spacers. A single spot weld is used to hold the assembly together, as is common industrial practice.

Brazing is done in a vacuum furnace which is evacuated to a pressure of $1.33 \times 10^{-2}$ Pa ($10^{-4}$ Torr). The furnace is held at 1250° C. for 15 minutes.

When three brazed shear specimens are subjected to tensile shear testing, the following results should be obtained.

| Sample | Minimum Shear Strength | | Minimum Tensile Strength | | Area of Failure |
|---|---|---|---|---|---|
| | GPA | psi | GPA | psi | |
| 1-A | .162 | 23,500 | .648 | 94,000 | Base metal |
| 1-B | .122 | 17,700 | .487 | 70,700 | Base metal |
| 1-C | .138 | 20,000 | .551 | 80,000 | Base metal |

The brazes will fail in the base metal, not in the braze. Therefore, the values reported are lower bounds.

EXAMPLE 3

Tensile test specimens are cut from AISI 316 stainless steel, in strip form. The composition of AISI 316 stainless steel is given in Table IV.

TABLE IV

| | Composition, weight % | | | | | | |
|---|---|---|---|---|---|---|---|
| | Fe | Ni | Cr | C | Mn | Si | Mo | Others |
| AISI 316 | Bal | 10-14 | 16-18 | 0.08 | 2.0 | 1.0 | 2-3 | .075 |

The thickness is 0.3175 cm (0.125 inch). A brazing alloy of the invention, a glassy ductile ribbon of nominal composition of sample No. 2 and having dimensions 46 μm (0.0018 inch) thick by 6.3 mm (0.25 inch) wide is used to braze these test specimens.

Brazing is done in a vacuum furnace which is evacuated to a pressure of $1.33 \times 10^{-2}$ Pa ($10^{-4}$ Torr). The furnace is held at 1250° C. for 15 minutes.

When these brazed shear specimens are subjected to tensile shear testing, the following results should be obtained.

| Sample | Minimum Shear Strength | | Minimum Tensile Strength | | Area of Failure |
|---|---|---|---|---|---|
| | GPA | psi | GPA | psi | |
| 2-A | .144 | 20,900 | .576 | 83,600 | Base metal |
| 2-B | .142 | 20,600 | .569 | 82,600 | Base metal |
| 2-C | .143 | 20,800 | .574 | 83,300 | Base metal |

The brazes will fail in the base metal, not in the braze; therefore the values reported are lower bounds.

What is claimed is:

1. A homogeneous, ductile brazing foil composed of metastable material having at least 50 percent glassy structure and a composition consisting essentially of about 1 to 41 atom percent palladium, 0 to about 20 atom percent chromium, 11 to about 20 atom percent boron, and the balance essentially nickel and incidental impurities, wherein the composition is such that the total of nickel, palladium and chromium ranges from about 80 to 89 atom percent.

2. The brazing foil of claim 1 which is at least about 80% glassy.

3. The brazing foil of claim 1 which is substantially glassy.

4. The brazing foil of claim 1 having a thickness ranging from about 20 μm to 90 μm.

* * * * *